(12) United States Patent
Cho

(10) Patent No.: US 12,179,553 B2
(45) Date of Patent: Dec. 31, 2024

(54) VEHICLE AIR VENT WITH KNOB FOR CONTROLLING A FIRST WING, SECOND WING AND GUIDE CASE

(71) Applicant: HYUNDAI MOBIS Co., Ltd., Seoul (KR)

(72) Inventor: Seong Cheon Cho, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 386 days.

(21) Appl. No.: 17/698,520

(22) Filed: Mar. 18, 2022

(65) Prior Publication Data

US 2023/0202259 A1   Jun. 29, 2023

(30) Foreign Application Priority Data

Dec. 29, 2021   (KR) .................. 10-2021-0190787

(51) Int. Cl.
*B60H 1/00* (2006.01)
(52) U.S. Cl.
CPC ..... *B60H 1/00671* (2013.01); *B60H 1/00514* (2013.01); *B60H 1/0065* (2013.01)
(58) Field of Classification Search
CPC .. B60H 1/0065; B60H 1/3414; B60H 1/3428; B60H 2001/3464; B60H 2001/3478
See application file for complete search history.

(56) References Cited

U.S. PATENT DOCUMENTS

| 9,963,015 | B1 * | 5/2018 | Fraser | B60H 1/3414 |
| 2020/0361282 | A1 * | 11/2020 | Kim | B60H 1/34 |
| 2020/0406722 | A1 * | 12/2020 | Kim | B60H 1/0065 |
| 2023/0019531 | A1 * | 1/2023 | Desai | F24F 13/15 |

FOREIGN PATENT DOCUMENTS

| GB | 2590404 | A |   | 6/2021 |
| JP | 59-18011 | A |   | 1/1984 |
| JP | H59-18011 | A |   | 1/1984 |
| JP | 11-51459 | A |   | 2/1999 |
| JP | 3176136 | U | * | 6/2012 |
| JP | 2017-206068 | A |   | 11/2017 |
| JP | 2019-38407 | A |   | 3/2019 |
| KR | 10-2021-0001534 | A |   | 1/2021 |
| WO | 2021/123776 | A1 |   | 6/2021 |

OTHER PUBLICATIONS

Extended European Search Report issued in corresponding European Patent Application No. 22162300.2 dated Aug. 23, 2022.
Extended European Search Report dated Aug. 23, 2022, issued in corresponding European Patent Application No. 22162300.2.
Office Action issued in corresponding Korean Patent Application 10-2021-0190787 dated Aug. 16, 2023, with English translation.

* cited by examiner

*Primary Examiner* — Edelmira Bosques
*Assistant Examiner* — Michael James Giordano
(74) *Attorney, Agent, or Firm* — MORGAN, LEWIS & BOCKIUS LLP

(57) ABSTRACT

Disclosed is a vehicle air vent improved to simplify an operation mechanism by reducing the number of components for adjusting a wind direction while an outlet is slimmed. The vehicle air vent includes a vehicle air vent including a duct housing, a first wing assembly disposed at a side of an outlet of the duct housing, a second wing assembly disposed in the duct housing, and a knob coupled to the first wing assembly, wherein the knob includes a knob pin movably disposed in the first wing assembly.

11 Claims, 22 Drawing Sheets

[FIG. 1]
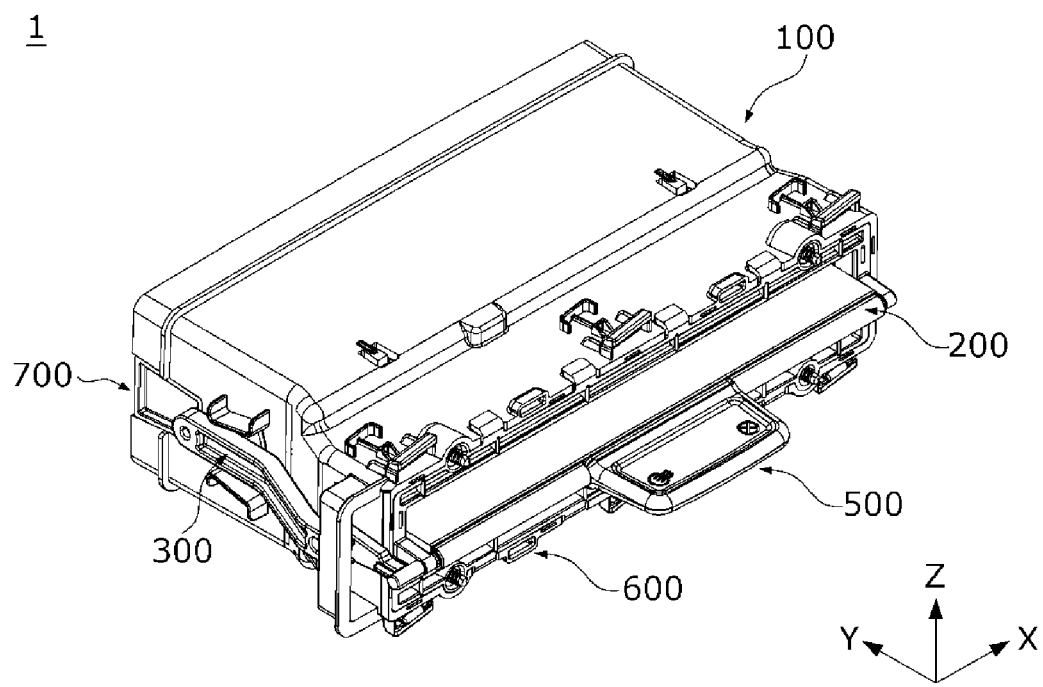

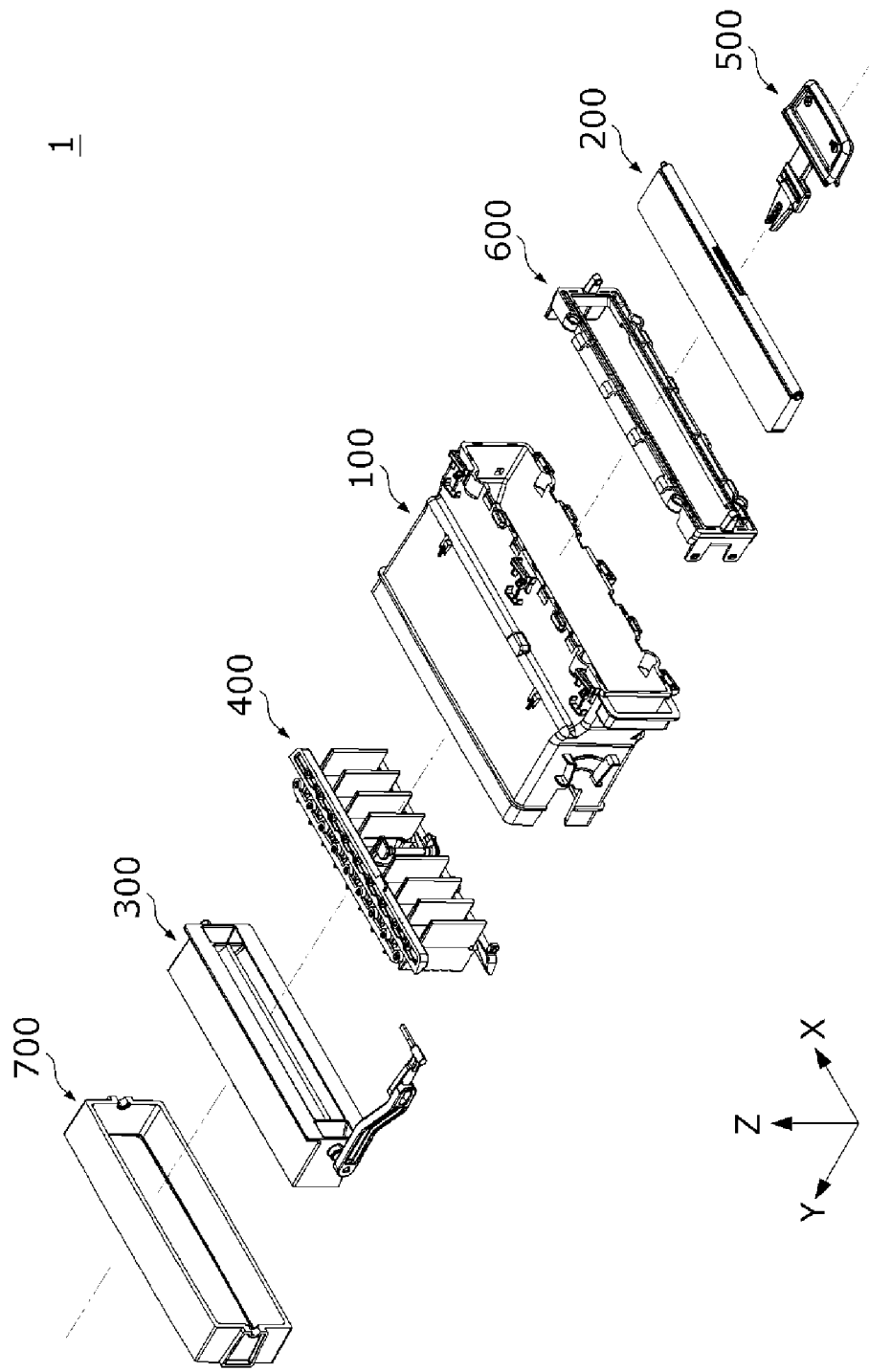
[FIG. 2]

[FIG. 3]
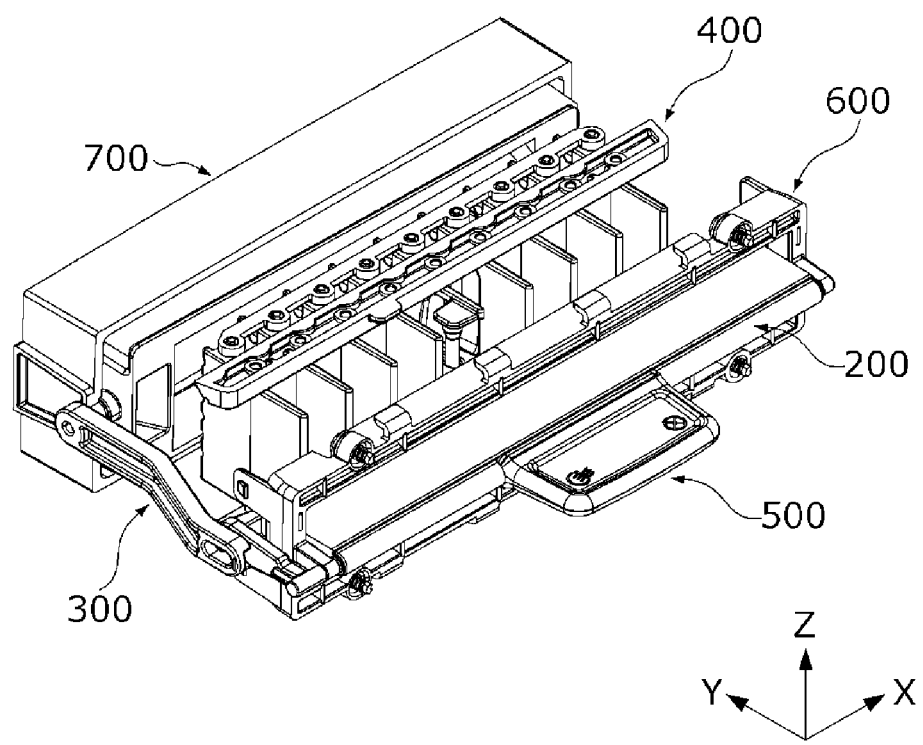

[FIG. 4]
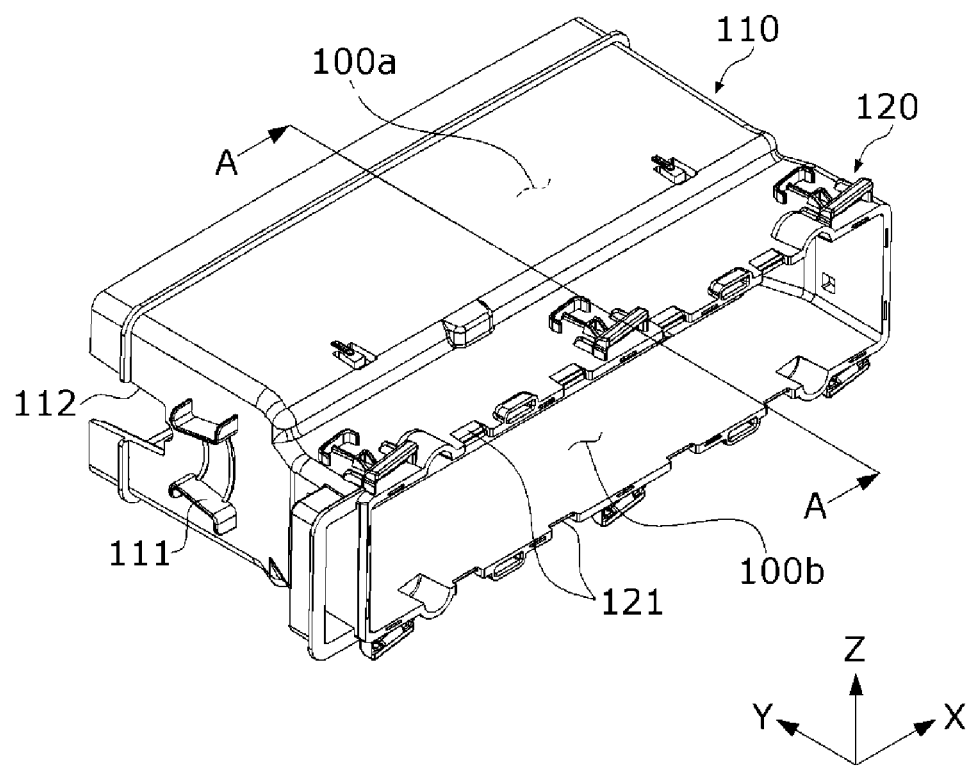

[FIG. 5]
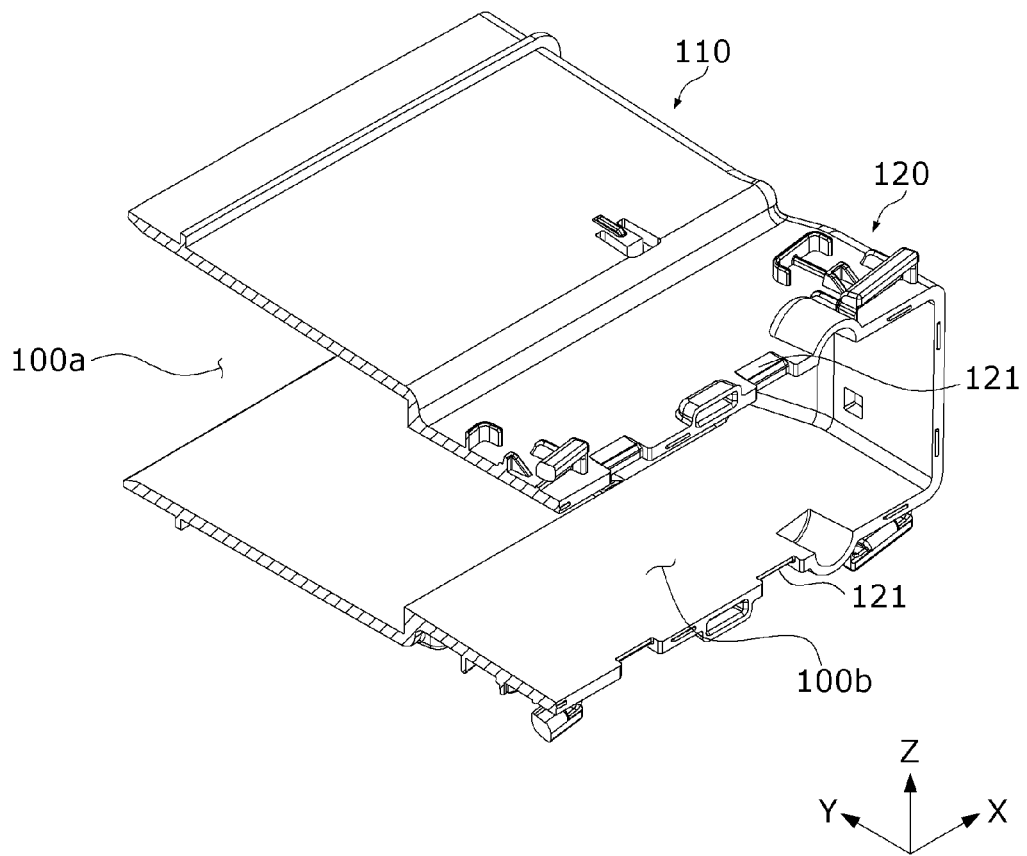

[FIG. 6]
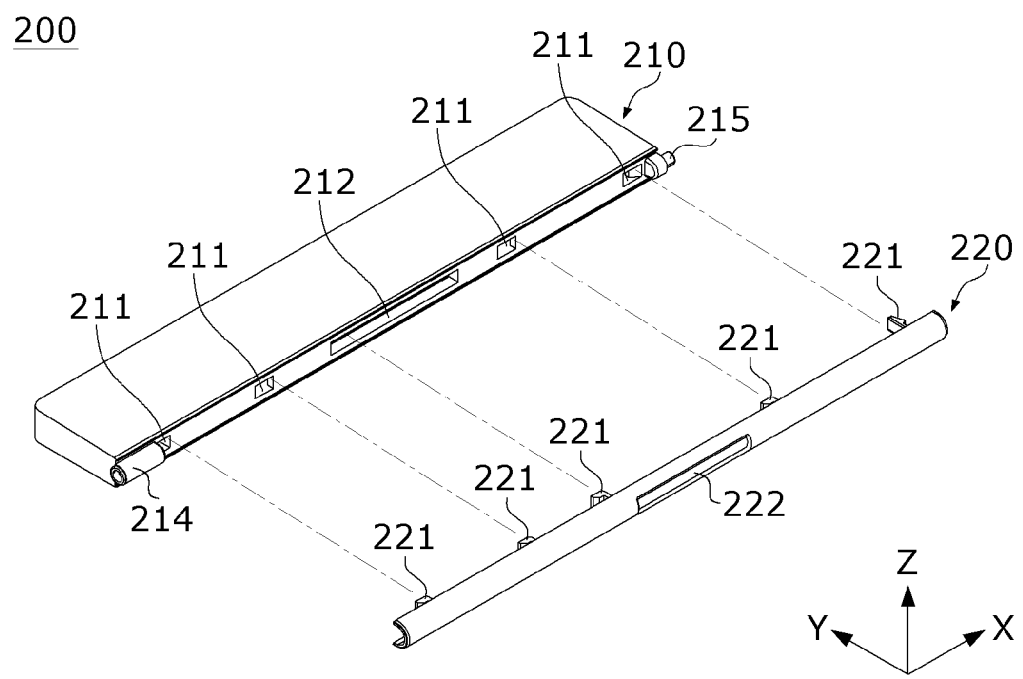

[FIG. 7]
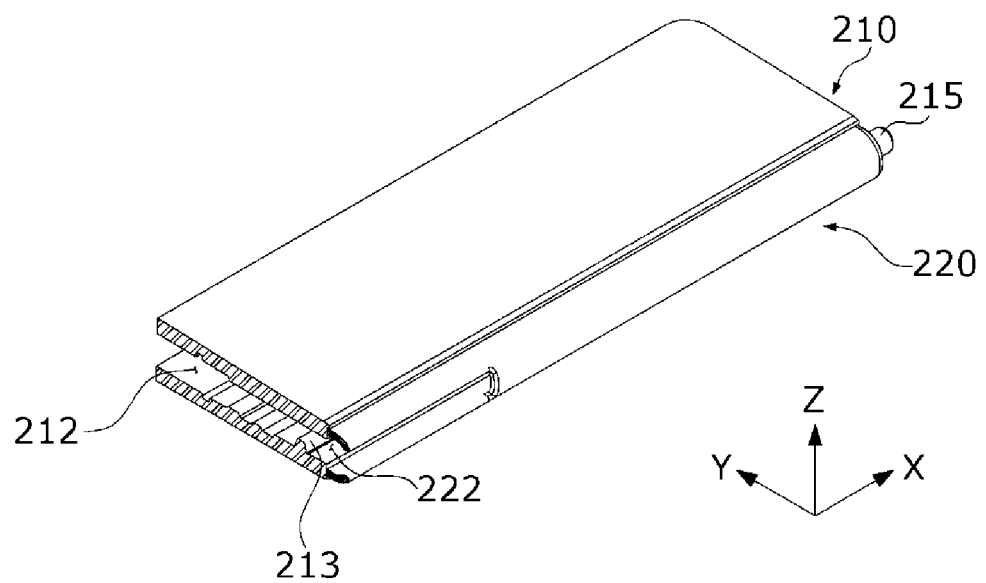

[FIG. 8]
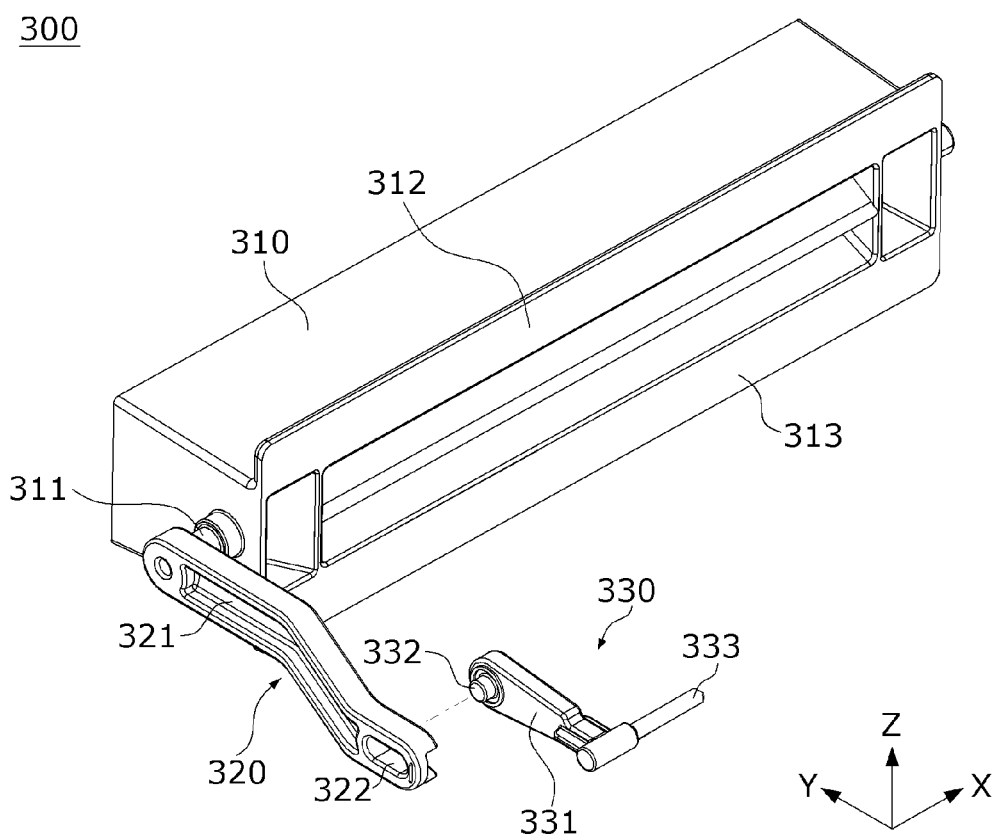

[FIG. 9]
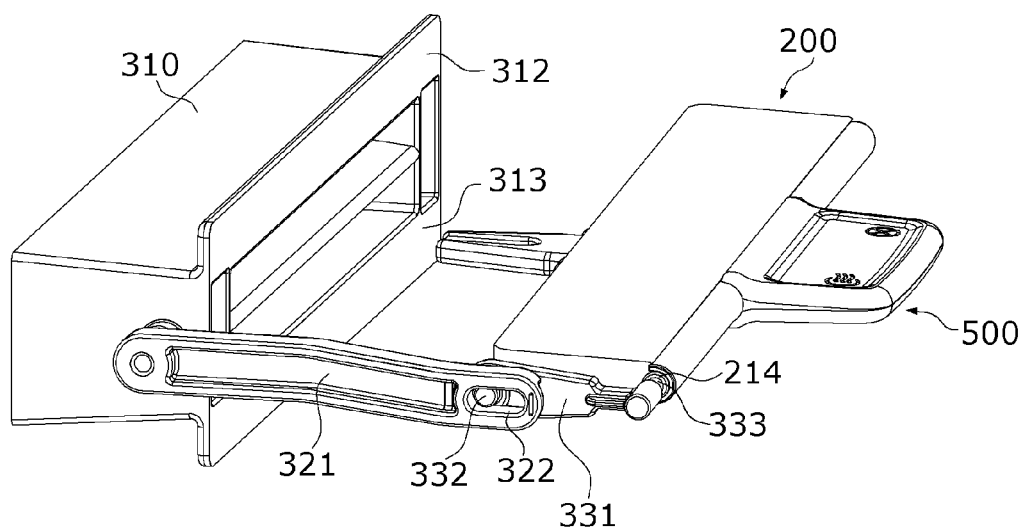

[FIG. 10]
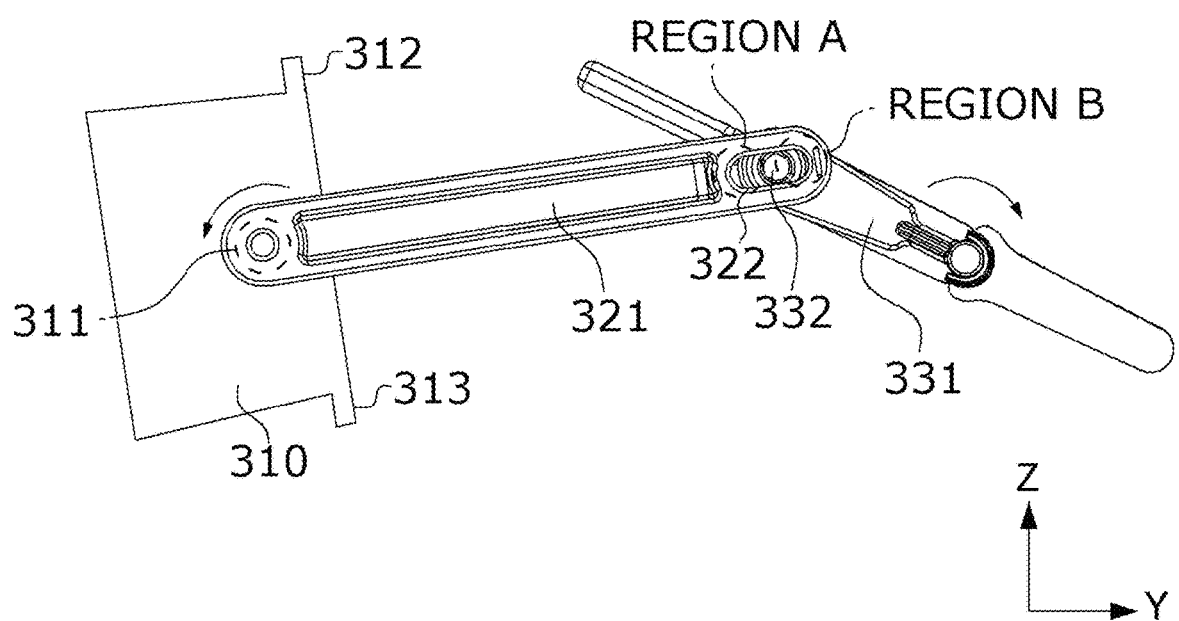

[FIG. 11]
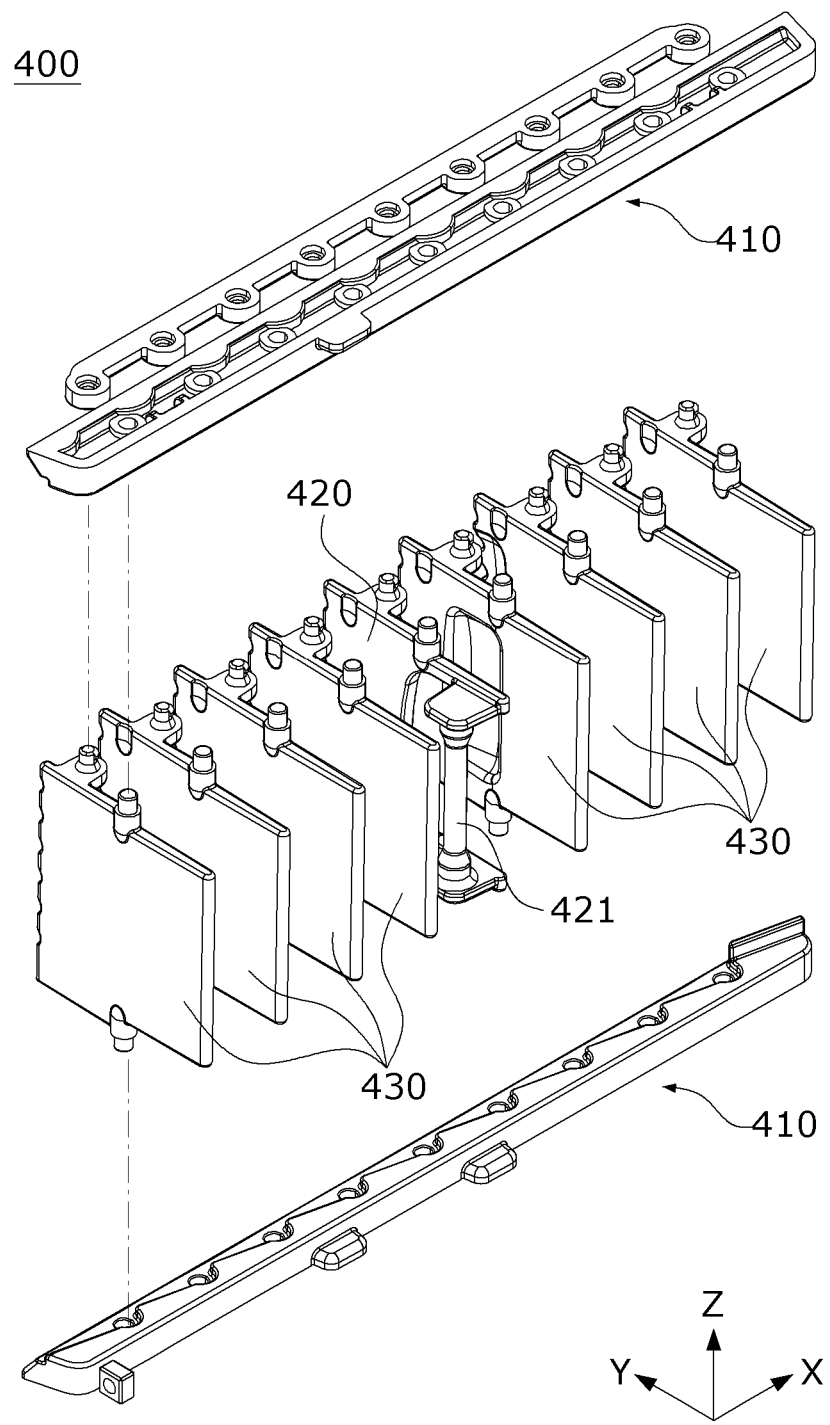

[FIG. 12]
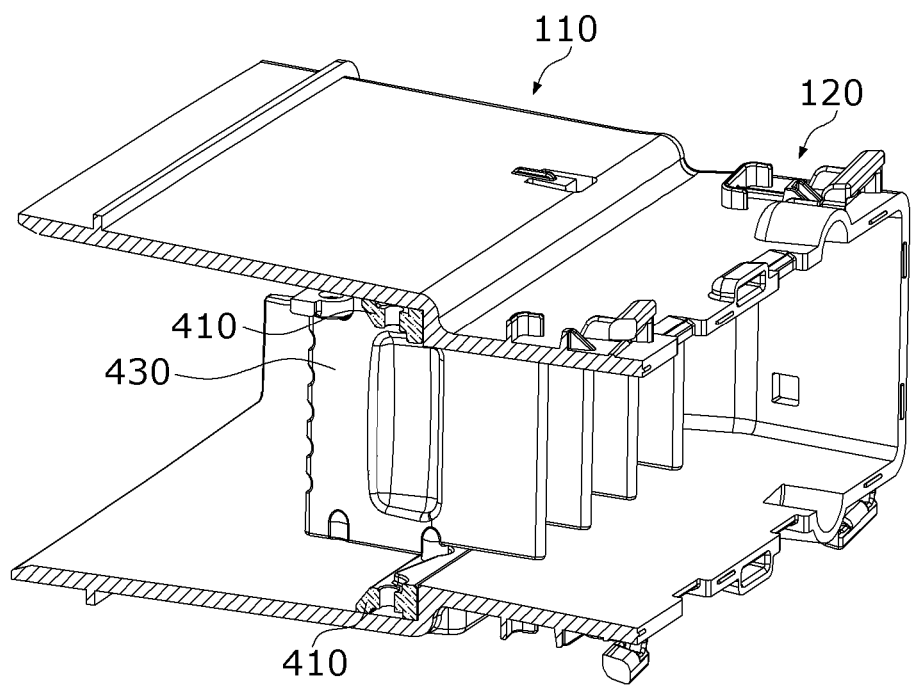

[FIG. 13]
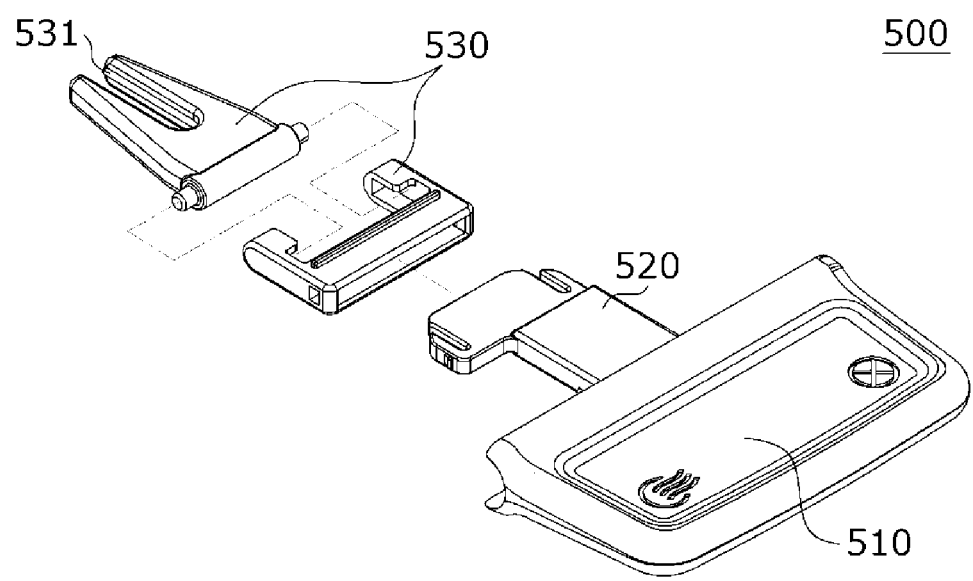

[FIG. 14]
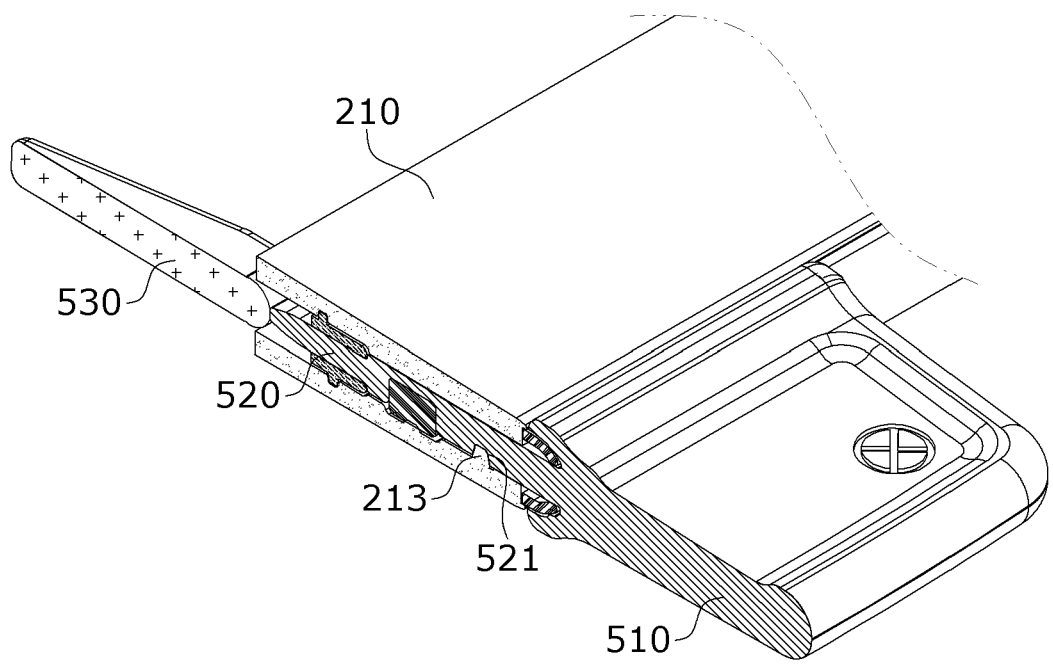

[FIG. 15]
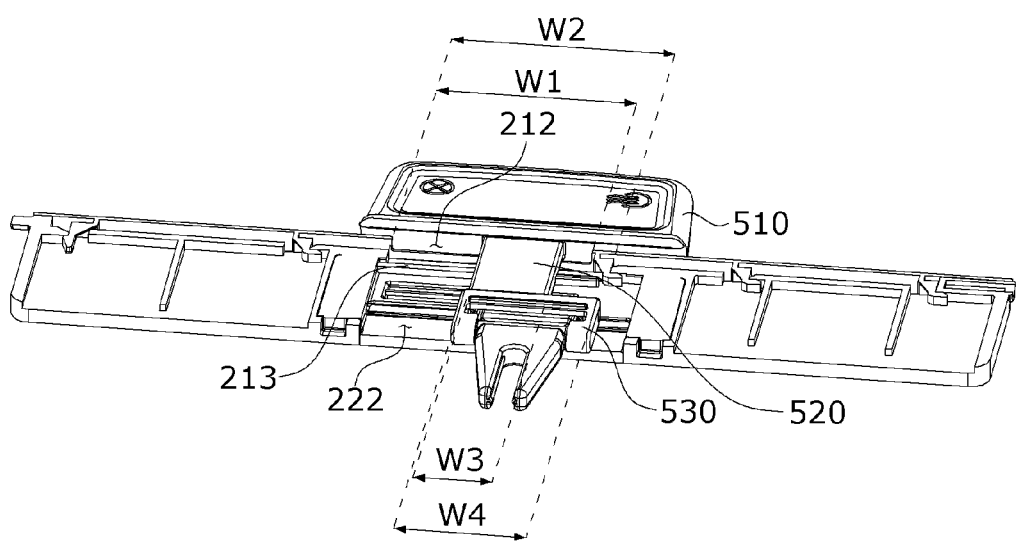

[FIG. 16]
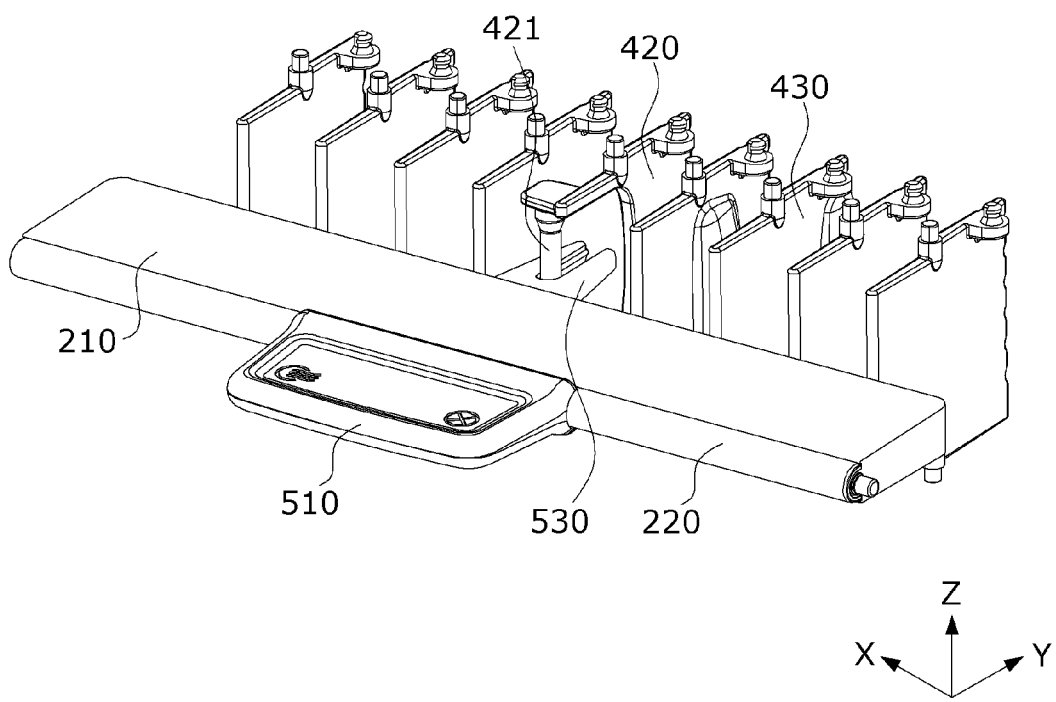

[FIG. 17A]
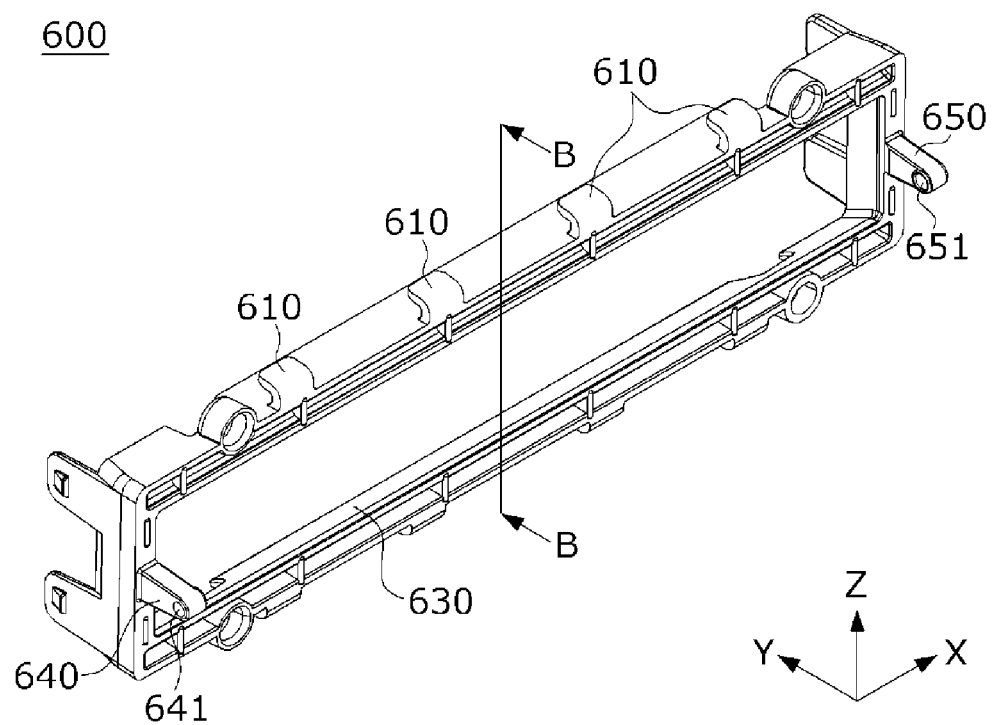

[FIG. 17B]
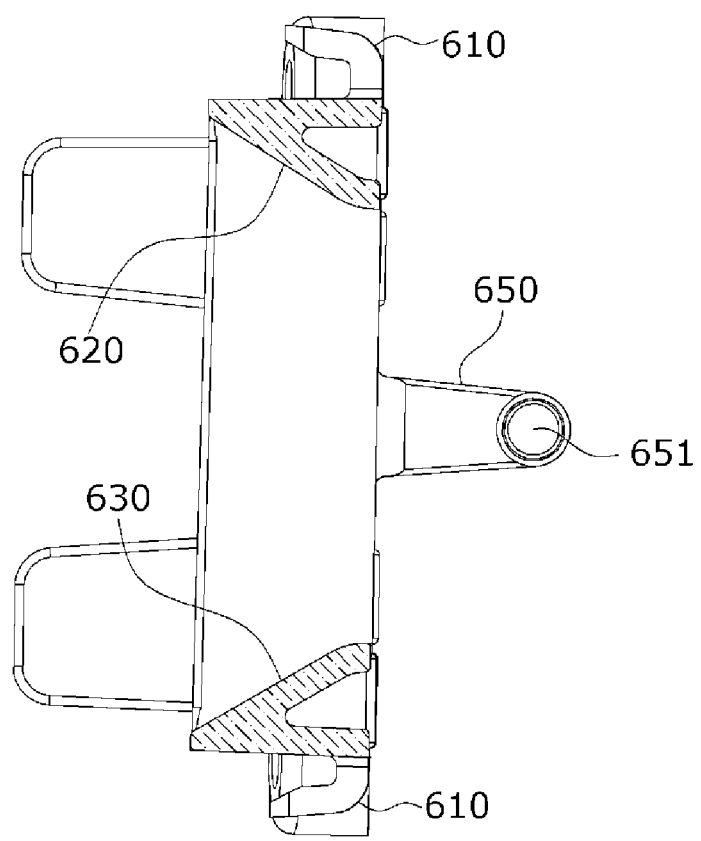

[FIG. 18]
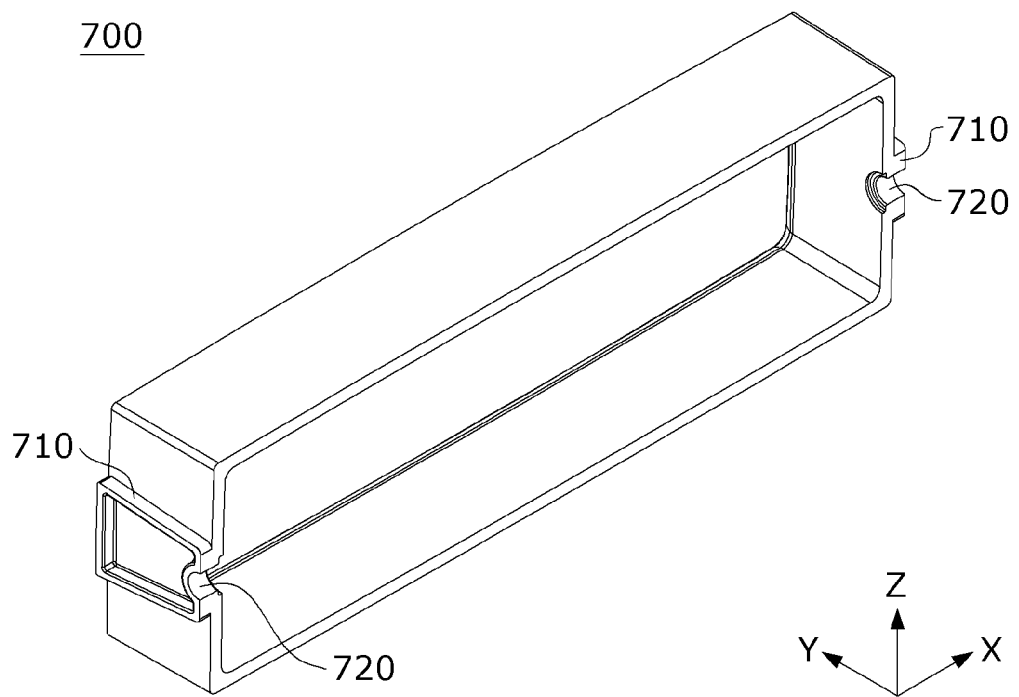

[FIG. 19]
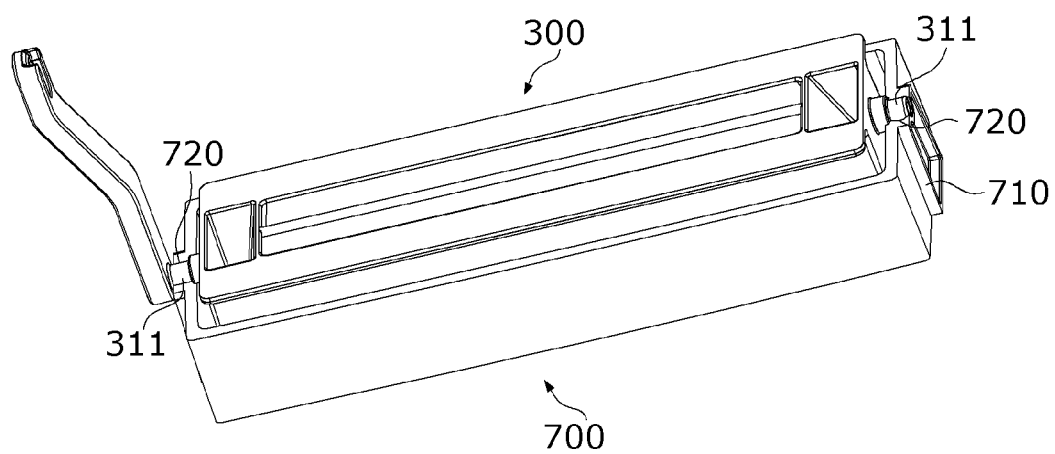

[FIG. 20A]
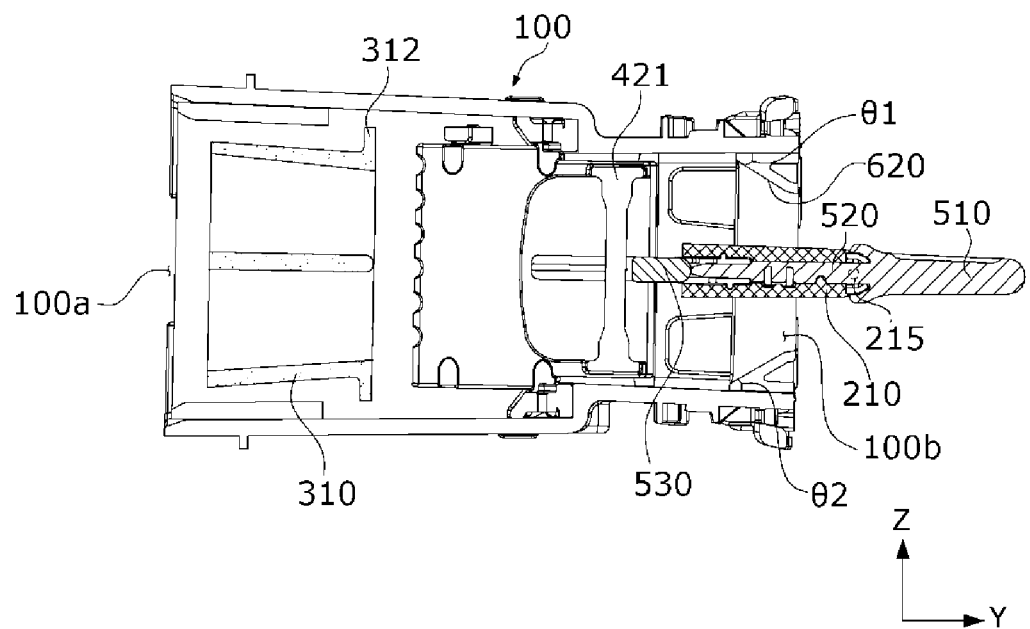

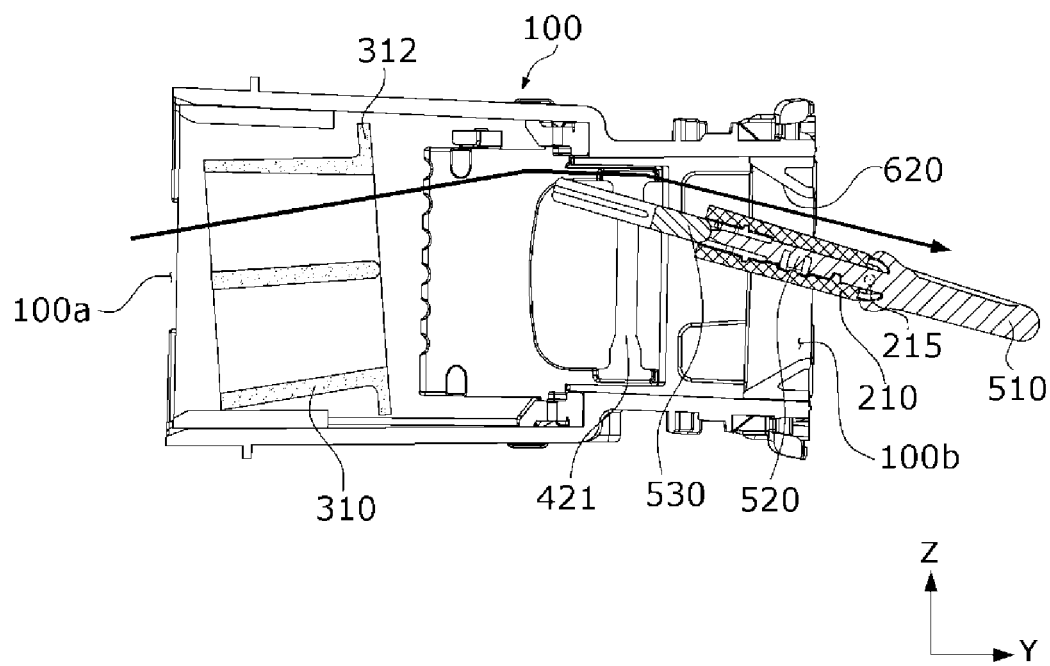
[FIG. 20B]

VEHICLE AIR VENT WITH KNOB FOR CONTROLLING A FIRST WING, SECOND WING AND GUIDE CASE

CROSS-REFERENCE TO RELATED APPLICATION

This application claims priority to and the benefit of Korean Patent Application No. 10-2021-0190787, filed on Dec. 29, 2021, the disclosure of which is incorporated herein by reference in its entirety.

BACKGROUND

1. Technical Field

The present disclosure relates to a vehicle air vent.

2. Discussion of Related Art

A vehicle is equipped with an air conditioner for adjusting an indoor air temperature and ventilation. The air conditioner generates warm air to maintain an interior of the vehicle to be warm in winter and generates cool air to maintain the interior of the vehicle to be cool in summer.

The air conditioner may include an air conditioning unit which adjusts an air temperature by exchanging heat between air and a heat exchange medium and a blower unit which supplies air to the air conditioning unit. In the vehicle, the conditioned air may be supplied to the interior through an air vent connected to the air conditioning unit. The air vent is disposed inside a dashboard, and an outlet is exposed toward a passenger room through a hole formed in the dashboard.

Recently, according to a trend of slimming a cockpit module in the vehicle, slimming of the outlet of the air vent is also being studied.

However, the conventional air vent has a problem in that manufacturing costs increase because many components are used in the air vent in order to prevent loss of air volume flowing toward the passenger room while the outlet is slimmed.

In addition, since the number of the components of the air vent is large, an operation mechanism may be complex. Accordingly, when the components are damaged, there is a problem in that a time required for disassembling and replacing the components increases.

SUMMARY

The present disclosure is directed to providing a vehicle air vent improved to simplify an operation mechanism by reducing the number of components for adjusting a wind direction while an outlet is slimmed.

According to an aspect of the present disclosure, there is provided a vehicle air vent including a vehicle air vent including a duct housing, a first wing assembly disposed at a side of an outlet of the duct housing, a second wing assembly disposed in the duct housing, and a knob coupled to the first wing assembly, wherein the knob includes a knob pin movably disposed in the first wing assembly.

The vehicle air vent may include a guide assembly coupled to the first wing assembly and rotated in conjunction with movement of the knob.

The guide assembly may include a guide case which is disposed in the duct housing and guides a flow of air, a first link coupled to an end portion of the guide case and disposed outside the duct housing, and a second link which connects the first link and the first wing assembly, wherein the second link may be rotated according to the first wing assembly rotated along with the knob.

A rotation direction of the first link and a rotation direction of the second link may be opposite to each other.

The duct housing may include a stopper which is obliquely disposed on an outer surface of the duct housing and comes into contact with the first link, and rotation of the guide case may stop when the first link comes into contact with the stopper.

The first wing assembly may include a first wing body in which a first through hole is formed, and a second wing body which is coupled to the first wing body and in which a second through hole communicating with the first through hole is formed.

A width of the first through hole and a width of the second through hole may be greater than a width of the knob pin.

The knob may further include a knob body which supports the knob pin, is coupled to the second wing body, and is disposed outside the duct housing and a connector which is coupled to each of the knob pin and the second wing assembly and moves in conjunction with movement of the knob pin.

The knob pin may include a slide groove concavely formed in the knob pin to be movable in the first through hole in a sliding manner.

The first wing body may include a slide protrusion which is coupled to the slide groove and supports the knob pin to be movable in a sliding manner.

The vehicle air vent may further include a guide block disposed at a side of the outlet of the duct housing, wherein the guide block may include a first inclined surface disposed to be inclined upward from the knob toward the duct housing and a second inclined surface disposed to be inclined downward from the knob toward the duct housing.

The vehicle air vent may include a support housing which is disposed at a side of an inlet of the duct housing and supports the guide case.

The guide case may include a flange protruding from each of two end portions toward an inner surface of the duct housing.

When the guide case is rotated in conjunction with rotation of the knob, the flange may come into contact with the inner surface of the duct housing.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 1 is a perspective view illustrating a vehicle air vent according to an embodiment of the present disclosure;

FIG. 2 is an exploded perspective view illustrating the vehicle air vent according to the embodiment of the present disclosure;

FIG. 3 is a view illustrating a remaining structure after a duct housing is separated from the vehicle air vent according to the embodiment of the present disclosure;

FIG. 4 is a view illustrating the duct housing according to the embodiment of the present disclosure;

FIG. 5 is a cross-sectional view taken along line A-A of FIG. 4;

FIG. 6 is an exploded perspective view illustrating a first wing assembly according to an embodiment of the present disclosure;

FIG. 7 is a cross-sectional illustrating of a first wing assembly according to an embodiment of the present disclosure.

FIG. 8 is an exploded perspective view illustrating a guide assembly according to an embodiment of the present disclosure;

FIG. 9 is a view illustrating an aspect in which a first wing assembly, a guide assembly, and a knob are coupled according to an embodiment of the present disclosure;

FIG. 10 is a view illustrating an aspect in which a first link and a second link rotate in opposite directions according to an embodiment of the present disclosure;

FIG. 11 is an exploded perspective view illustrating a second wing assembly according to an embodiment of the present disclosure;

FIG. 12 is a cross-sectional illustrating an aspect in which a second wing assembly is disposed in a duct housing according to an embodiment of the present disclosure;

FIG. 13 is an exploded perspective view illustrating a knob according to an embodiment of the present disclosure;

FIG. 14 is a cross-sectional view illustrating a state in which a knob is coupled to a first wing assembly according an the embodiment of the present disclosure;

FIG. 15 is a view illustrating an aspect in which a knob is coupled to a first wing assembly according to an embodiment of the present disclosure;

FIG. 16 is a view illustrating an aspect in which a connector is coupled to a second wing assembly according to an embodiment of the present disclosure;

FIG. 17A is a view illustrating a guide block according to an embodiment of the present disclosure;

FIG. 17B is a cross-sectional view taken along line B-B of FIG. 17A;

FIG. 18 is a view illustrating a support housing according to an embodiment of the present disclosure;

FIG. 19 is a view illustrating an aspect in which a guide case is coupled to a support housing according to an embodiment of the present disclosure;

FIG. 20A is a cross-sectional view illustrating an interior of the vehicle air vent according to the embodiment of the present disclosure; and FIG. 20B is a view illustrating an aspect in which the knob, the first wing assembly, and the guide assembly are rotated according to the embodiment of the present disclosure.

DETAILED DESCRIPTION OF EXEMPLARY EMBODIMENTS

Since the present disclosure allows various changes and has many embodiments, specific embodiments will be illustrated in the accompanying drawings and described. However, this is not intended to limit the present disclosure to the specific embodiments, and it is to be appreciated that all changes, equivalents, and substitutes that fall within the spirit and technical scope of the present disclosure are encompassed in the present disclosure.

Although the terms "first," "second," and the like may be used herein to describe various elements, these elements should not be limited by these terms. These terms are only used to distinguish one element from another. For example, a second element could be termed a first element, and a first element could similarly be termed a second element without departing from the scope of the present disclosure. The term "and/or" includes any one or any combination among a plurality of associated listed items.

When an element is referred to as being "connected" or "coupled" to another element, it will be understood that the element can be directly connected or coupled to another element, or other elements may be present therebetween. In contrast, when an element is referred to as being "directly connected" or "directly coupled" to another element, it will be understood that there are no intervening elements.

In a description of the embodiment, in a case in which any one element is described as being formed on or under another element, such a description includes both a case in which the two elements are formed to be in direct contact with each other and a case in which the two elements are in indirect contact with each other such that one or more other elements are interposed between the two elements. In addition, when one element is described as being formed on or under another element, such a description may include a case in which the one element is formed at an upper side or a lower side with respect to another element.

The terminology used herein is for the purpose of describing particular embodiments only and is not intended to limit the present disclosure. The singular forms are intended to include the plural forms, unless the context clearly indicates otherwise. In the present specification, it should be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

Unless otherwise defined, all terms including technical and scientific terms used herein have meanings which are the same as meanings generally understood by those skilled in the art. Terms, such as those defined in commonly used dictionaries, should be interpreted as having meanings that are consistent with their meanings in the context of the relevant art and will not be interpreted in an idealized or overly formal sense unless expressly so defined here.

Hereinafter, in the detailed description of the embodiments with reference to the accompanying drawings, components that are the same or correspond to each other will be denoted by the same reference numerals regardless of the reference numerals, and redundant descriptions will be omitted.

FIG. 1 is a perspective view illustrating a vehicle air vent according to an embodiment of the present disclosure, FIG. 2 is an exploded perspective view illustrating the vehicle air vent according to the embodiment of the present disclosure, and FIG. 3 is a view illustrating a remaining structure after a duct housing is separated from the vehicle air vent according to the embodiment of the present disclosure.

In the present specification, an X direction may be a vehicle width direction or left-right direction, a Y direction may be a front-rear direction or air flow direction, and a Z direction may be a vertical direction perpendicularly intersecting the X direction and the Y direction. In addition, the vertical direction may include an upward direction toward a ceiling of the vehicle and a downward direction opposite the upward direction.

Referring to FIGS. 1 to 3, a vehicle air vent 1 according to the embodiment of the present disclosure may be connected to an air conditioner (not shown), may adjust a wind direction of conditioned air, and may discharge the conditioned air to a passenger room.

The vehicle air vent 1 includes a duct housing 100, a first wing assembly 200, a guide assembly 300, a second wing assembly 400, a knob 500, a guide block 600, and a support housing 700.

FIG. 4 is a view illustrating the duct housing according to the embodiment of the present disclosure, and FIG. 5 is a cross-sectional view taken along line A-A of FIG. 4.

Referring to FIGS. 1 to 5, the duct housing 100 may guide air, which is conditioned through the air conditioner (not shown), to be discharged toward the passenger room. The duct housing 100 may have a hollow rectangular parallelepiped shape so that an inlet 100a through which air flows and an outlet 100b through which air is discharged are formed but is not limited thereto.

The duct housing 100 includes a first duct body 110 and a second duct body 120.

The first duct body 110 may guide air supplied from the air conditioner (not shown) in a direction toward the passenger room. The inlet 100a, through which the air supplied from the air conditioner (not shown) may flow, may be disposed in the first duct body 110.

The first duct body 110 may include a stopper 111 and a fixing groove 112.

The stopper 111 disposed on an outer surface of the duct housing 100. The stopper 111 is disposed to be inclined in a direction from the inlet 100a toward the outlet 100b. The stopper 111 may be disposed above and under a first link 320 in the Y direction which will be described below. The stopper 111 may come into contact with the first link 320 to stop rotation of the first link 320.

The fixing groove 112 may be disposed in each of two end portions of the first duct body 110. The fixing groove 112 may be coupled to a part of the support housing 700 and may support the part of the support housing 700.

The second duct body 120 is formed so that an end portion of the second duct body 120 in the Y direction is stepped from the first duct body 110. The outlet 100b formed so that air flowing through the inlet 100a may be discharged may be disposed in the second duct body 120.

The second duct body 120 may include a first hooking groove 121.

The first hooking groove 121 may be disposed in each of an upper surface and a lower surface of an end portion of the second duct body 120 at a side of the outlet 100b in the Z direction. A plurality of first hooking grooves 121 may be disposed to be spaced apart from each other in the X direction. The first hooking groove 121 may be coupled to a second hooking protrusion 610 of the guide block 600.

FIG. 6 is an exploded perspective view illustrating the first wing assembly according to the embodiment of the present disclosure, and FIG. 7 is a cross-sectional illustrating of a first wing assembly according to an embodiment of the present disclosure.

Referring to FIGS. 6 and 7, the first wing assembly 200 is disposed at the side of the outlet 100b of the duct housing 100. The first wing assembly 200 may be rotatably coupled to a part of the guide assembly 300. The first wing assembly 200 may be coupled to the knob 500. Accordingly, the first wing assembly 200 may be rotated upward or downward by the knob 500 to determine a flow direction of air flowing toward the passenger room.

The first wing assembly 200 may include a first wing body 210 and a second wing body 220.

The first wing body 210 may be disposed in the X direction. The first wing body 210 may be rotated in conjunction with vertical movement of the knob 500.

The first wing body 210 may include a second hooking groove 211, a first through hole 212, a slide protrusion 213, a first coupling protrusion 214, and a second coupling protrusion 215.

The second hooking groove 211 is concavely formed in one surface of the first wing body 210 in the Y direction. A plurality of second hooking grooves 211 may be disposed to be spaced apart from each other in the X direction.

The first through hole 212 may be disposed between the plurality of second hooking grooves 211. The first through hole 212 may pass through the first wing body 210 from one surface thereof in the direction (Y direction) from the outlet 100b toward the inlet 100a. When the knob 500 is coupled to the first wing assembly 200, a part of the knob 500 may be disposed in the first through hole 212.

As illustrated in FIG. 7, the slide protrusion 213 may protrude from an inner surface of the first wing body 210 in the Y direction.

The slide protrusion 213 may be coupled to a part of the knob 500 disposed in the first through hole 212. The slide protrusion 213 may support the part of the knob 500 so that the knob 500 may move in a sliding manner in the X direction.

The first coupling protrusion 214 may be disposed on an end portion of the first wing body 210 in the Y direction. The first coupling protrusion 214 may have a hollow cylindrical shape. An inner portion of the first coupling protrusion 214 may have a shape corresponding to a shape of a part of a second link 330 so that the first coupling protrusion 214 is coupled to the second link 330.

The second coupling protrusion 215 may be disposed on an end portion of the first wing body 210 in the Y direction. The second coupling protrusion 215 may be disposed at a side opposite to the portion on which the first coupling protrusion 214 is disposed.

The second coupling protrusion 215 may have a cylindrical shape. The second coupling protrusion 215 may be coupled to a part of the guide block 600. Accordingly, the first wing assembly 200 may be fixed to the guide block 600.

The second wing body 220 is coupled to the first wing body 210. The second wing body 220 may be coupled to the knob 500 and may guide movement of the knob 500 in the X direction.

The second wing body 220 may include a first hooking protrusion 221 and a second through hole 222.

The first hooking protrusion 221 may be coupled to the second hooking groove 211. The first hooking protrusion 221 may be coupled to the second hooking groove 211 so that the second wing body 220 may be coupled to the first wing body 210. A plurality of first hooking protrusions 221 may be disposed to be spaced apart from each other in the X direction.

The second through hole 222 may be disposed between the plurality of first hooking protrusions 221. The second through hole 222 may pass through the second wing body 220 from one surface thereof in the direction (Y direction) from the outlet 100b toward the inlet 100a. When the second wing body 220 is coupled to the first wing body 210, the first through hole 212 and the second through hole 222 may communicate with each other. Accordingly, when the knob 500 is coupled to the first wing assembly 200, a part of the knob 500 may be disposed in the first through hole 212 and the second through hole 222.

FIG. 8 is an exploded perspective view illustrating the guide assembly according to the embodiment of the present disclosure, FIG. 9 is a view illustrating an aspect in which the first wing assembly, the guide assembly, and the knob are coupled according to the embodiment of the present disclosure, and FIG. 10 is a view illustrating an aspect in which a first link and a second link are rotated in opposite directions according to the embodiment of the present disclosure.

Referring to FIGS. 8 to 10, the guide assembly 300 may be coupled to the first wing assembly 200. The guide assembly 300 may be rotated in conjunction with movement of the knob 500 in a state in which the guide assembly 300 is coupled to the first wing assembly 200. The guide assembly 300 may guide a flow of air flowing into an inner portion of the duct housing 100 through the inlet 100a.

The guide assembly 300 includes a guide case 310, the first link 320, and the second link 330.

The guide case 310 may be disposed in the duct housing 100. More specifically, the guide case 310 may be disposed in the support housing 700 disposed in the duct housing 100.

The guide case 310 may be rotated in conjunction with rotation of the knob 500 in the Y direction. In addition, as illustrated in FIG. 10, the guide case 310 may be rotated along with the first link 320 about a shaft protrusion 311.

For example, the guide case 310 may be rotated along with the first link 320 about the shaft protrusion 311 in a clockwise direction. In addition, the guide case 310 may be rotated along with the first link 320 about the shaft protrusion 311 in a counterclockwise direction.

The guide case 310 may include the shaft protrusion 311, a first flange 312, and a second flange 313.

The shaft protrusion 311 may be disposed on each of two end portions of the guide case 310. The shaft protrusion 311 may be disposed in a space formed by the fixing groove 112 and a part of the support housing 700 which meet each other. The guide case 310 and the first link 320 may be connected by the shaft protrusion 311.

The first flange 312 and the second flange 313 have shapes protruding toward an inner surface of the duct housing 100 from two end portions of the guide case 310 in the Y direction.

The first flange 312 may protrude toward an upper side of the inner surface of the duct housing 100. When the guide case 310 is rotated in conjunction with rotation of the knob 500, the first flange 312 may be in contact with an inner surface of an upper side of the duct housing 100. Accordingly, the first flange 312 may prevent air flowing into the duct housing 100 from leaking to the upper outside of the guide case 310.

The second flange 313 may protrude toward a lower side of the inner surface of the duct housing 100. When the guide case 310 is rotated in conjunction with rotation of the knob 500, the second flange 313 may be in contact with an inner surface of a lower side of the duct housing 100. Accordingly, the second flange 313 may prevent air flowing into the duct housing 100 from leaking to the lower outside of the guide case 310.

The first link 320 may be coupled to the shaft protrusion 311 of the guide case 310. The first link 320 may be rotated along with the guide case 310 in conjunction with rotation of the knob 500. The first link 320 may determine an angle at which the guide case 310 rotates.

The first link 320 may include a first link body 321 and a guide hole 322.

The first link body 321 is coupled to the shaft protrusion 311. The first link body 321 may be disposed outside the duct housing 100. The first link body 321 may be rotated along with the guide case 310 about a rotation center of the shaft protrusion 311. When the first link body 321 comes into contact with the stopper 111, the rotation of the first link body 321 may be stopped. A rotation range of the first link body 321 may be determined by an inclination angle of the stopper 111.

The guide hole 322 may be disposed in a part of the first link body 321. The guide hole 322 may have a hole shape elongated in a direction in which the first link body 321 is disposed. A part of the second link 330 may be movably disposed in the guide hole 322.

The second link 330 may be connected to each of the first link 320 and the first wing assembly 200 to connect the first link 320 and the first wing assembly 200.

The second link 330 may include a second link body 331, a rotation protrusion 332, and a connection pin 333.

The second link body 331 may be rotated in conjunction with movement of the knob 500 in the same direction as a direction in which the first wing assembly 200 and knob 500 are rotated.

The rotation protrusion 332 protrudes from a part of the second link body 331. The rotation protrusion 332 may be movably disposed in the guide hole 322. More specifically, as illustrated in FIG. 10, the rotation protrusion 332 may be movably disposed between a region A and a region B of the guide hole 322.

Accordingly, the rotation protrusion 332 may move along the guide hole 322 so that the second link body 331 and the first link body 321 are directed to the same point. In this case, the first link body 321 and the second link body 331 rotate about the rotation protrusion 332 in different directions.

The connection pin 333 may be disposed on one end of the second link body 331. The connection pin 333 may be coupled to a hole formed in the first coupling protrusion 214. The connection pin 333 may connect the second link body 331 and the first wing assembly 200. When the first wing assembly 200 rotates along with the knob 500, the connection pin 333 may be rotated in the same direction as a direction in which the first wing assembly 200 is rotated. The second link body 331 may be rotated in the same direction as the direction in which the first wing assembly 200 is rotated due to the connection pin 333.

FIG. 11 is an exploded perspective view illustrating the second wing assembly according to the embodiment of the present disclosure, and FIG. 12 is a cross-sectional illustrating an aspect in which the second wing assembly is disposed in the duct housing according to the embodiment of the present disclosure.

Referring to FIGS. 11 and 12, the second wing assembly 400 is disposed in the duct housing 100. The second wing assembly 400 may be coupled to a part of the knob 500 and may support the part of the knob 500. The second wing assembly 400 may be rotated in conjunction with movement of the knob 500.

The second wing assembly 400 may include a support block 410, a third wing body 420, and a fourth wing body 430.

The support block 410 may be disposed in the duct housing 100. More specifically, as illustrated in FIG. 12, the support block 410 may be disposed on a stepped portion of the first duct body 110 and may be supported by the first duct body 110. The support block 410 may rotatably support the third wing body 420 and the fourth wing body 430.

The third wing body 420 may be rotatably coupled to the support block 410.

The third wing body 420 may include a rotation shaft 421.

The rotation shaft 421 may be disposed in the Z direction. The rotation shaft 421 may be formed in a cylindrical shape. The rotation shaft 421 may be coupled to a part of the knob 500 and may support the part of the knob 500. When the knob 500 moves left or right in the X direction, the rotation shaft 421 may be rotated along with the part of the knob 500 in conjunction with lateral movement of the part of the knob 500. When the rotation shaft 421 is rotated, the third wing body 420 is rotated.

The fourth wing body 430 may be rotatably coupled to the support block 410. When the rotation shaft 421 rotates, the fourth wing body 430 may be rotated in the same direction as a direction in which the third wing body 420 is rotated.

FIG. 13 is an exploded perspective view illustrating the knob according to the embodiment of the present disclosure, FIG. 14 is a cross-sectional view illustrating a state in which the knob is coupled to the first wing assembly according to the embodiment of the present disclosure, FIG. 15 is a view illustrating an aspect in which the knob is coupled to the first wing assembly according to the embodiment of the present disclosure, and FIG. 16 is a view illustrating an aspect in which a connector is coupled to the second wing assembly according to the embodiment of the present disclosure.

Referring to FIGS. 13 to 16, the knob 500 is coupled to each of the first wing assembly 200 and the second wing assembly 400. The knob 500 may control movement of the first wing assembly 200 and the second wing assembly 400.

The knob 500 includes a knob body 510, a knob pin 520, and a connector 530.

The knob body 510 may be coupled to the second wing body 220. The knob body 510 may be disposed outside the duct housing 100 in a state in which the knob body 510 is coupled to the second wing body 220.

The knob body 510 may be movably disposed on the second wing body 220 in a sliding manner in the X direction. The knob body 510 may control vertical rotation of the first wing body 210 and lateral movement of the second wing body 220.

The knob pin 520 may be coupled to the knob body 510. The knob pin 520 may be movably disposed in the first wing assembly 200. More specifically, the knob pin 520 may be disposed in the first through hole 212. Accordingly, the knob pin 520 may be moved in the first through hole 212 in a sliding manner in the X direction. In addition, the knob pin 520 may be moved upward or downward in conjunction with vertical movement of the knob body 510. The first wing assembly 200 may be moved upward or downward by the knob pin 520.

The knob pin 520 may include a slide groove 521.

The slide groove 521 may be concavely formed in one surface of the knob pin 520 toward an inner portion of the knob pin 520. The slide groove 521 may be movably supported in the slide protrusion 213. The knob pin 520 may be moved in the first through hole 212 in the sliding manner in the X direction due to the slide groove 521.

The connector 530 may be coupled to each of the knob pin 520 and the second wing assembly 400. The connector 530 may be disposed outside the first wing body 210 in a state in which the connector 530 is coupled to the knob pin 520.

The connector 530 may be coupled to and supported by the rotation shaft 421. A protruding rib 531 may be formed in a portion, which is coupled to the rotation shaft 421, of the connector 530. A state in which the connector 530 is supported by the rotation shaft 421 may be stably maintained by the protruding rib 531.

The connector 530 may be moved in conjunction with movement of the knob pin 520.

For example, when the knob body 510 is rotated upward or downward, the connector 530 may be moved in a sliding manner in a direction in which the rotation shaft 421 is disposed.

For example, when the knob body 510 is moved left or right, the connector 530 may rotate the third wing body 420 and the fourth wing body 430 while moving along with the knob pin 520.

As illustrated in FIG. 15, a first width W1 of the first through hole 212 and a second width W2 of the second through hole 222 may be greater than a third width W3 of the knob pin 520 and a fourth width W4 of the connector 530. Accordingly, the knob pin 520 and the connector 530 may slide in the first through hole 212 and the second through hole 222 in conjunction with movement of the knob body 510 in the X direction.

FIG. 17A is a view illustrating the guide block according to the embodiment of the present disclosure and FIG. 17B is a cross-sectional view taken along line B-B of FIG. 17A;

Referring to FIGS. 1, 3, 17A, and 17B, the guide block 600 may be disposed at the side of the outlet 100b of the duct housing 100. The guide block 600 may be disposed between the duct housing 100 and the first wing assembly 200. Along with the first wing assembly 200, the guide block 600 may set a moving direction of air discharged from the duct housing 100 through the outlet 100b.

The guide block 600 may include the second hooking protrusion 610, a first inclined surface 620, a second inclined surface 630, a first extension protrusion 640, and a second extension protrusion 650.

The second hooking protrusion 610 may be formed on each of an upper surface and a lower surface of the guide block 600. A plurality of second hooking protrusions 610 may be disposed to be spaced apart from each other in the X direction. The second hooking protrusion 610 may be coupled to the first hooking groove 121 of the duct housing 100. The second hooking protrusion 610 may be coupled to the first hooking groove 121 so that the guide block 600 may be fixed to the duct housing 100.

The first inclined surface 620 may be disposed to be inclined upward from the knob 500 toward the duct housing 100. Accordingly, as illustrated in FIG. 20A, the first inclined surface 620 may be disposed at a first angle $\theta 1$ with respect to an inner upper surface of the duct housing 100.

When the first wing assembly 200 rotates downward in conjunction with movement of the knob 500, the first inclined surface 620, along with the first wing body 210, may guide air toward a lower side of the passenger room.

The second inclined surface 630 may be disposed to be inclined downward from the knob 500 toward the duct housing 100. Accordingly, as illustrated in FIG. 20A, the second inclined surface 630 may be disposed at a second angle $\theta 2$ with respect to an inner lower surface of the duct housing 100.

When the first wing assembly 200 rotates upward in conjunction with movement of the knob 500, the second inclined surface 630, along with the first wing body 210, may guide air toward an upper side of the passenger room.

The first extension protrusion 640 may be disposed on an end portion of the guide block 600. The first extension protrusion 640 may be coupled to the connection pin 333 of the guide assembly 300 through a third through hole 641 formed to pass through the first extension protrusion 640 at one side thereof. Accordingly, a state in which the guide block 600 is coupled to the duct housing 100 may be stably maintained.

The second extension protrusion 650 may be disposed on an end portion of the guide block 600. The second extension protrusion 650 may include a coupling groove 651 concavely formed inward from one side thereof in the X direction. The coupling groove 651 may be coupled to the second coupling protrusion 215 of the first wing body 210. The coupling groove 651 may rotatably support the second coupling protrusion 215.

FIG. 18 is a view illustrating the support housing according to the embodiment of the present disclosure, and FIG. 19 is a view illustrating an aspect in which the guide case is coupled to the support housing according to the embodiment of the present disclosure.

Referring to FIGS. 18 and 19, the support housing 700 may be disposed at the side of the inlet 100a of the duct housing 100. The support housing 700 may support the guide case 310 in a state in which the support housing 700 is disposed in the duct housing 100.

The support housing 700 may include a fixing protrusion 710 and a support groove 720.

The fixing protrusion 710 protrude from each of two end portions of the support housing 700. The fixing protrusion 710 may be formed to have a shape corresponding to an outer surface of the fixing groove 112 of the duct housing 100. The fixing protrusion 710 may be coupled to the fixing groove 112. The fixing protrusion 710 may be coupled to the fixing groove 112 so that a state in which the support housing 700 is coupled to the duct housing 100 may be stably maintained.

The support groove 720 may be concavely formed inward from a part of the fixing protrusion 710 in the Y direction. The support groove 720 may have a hemispherical shape. As illustrated in FIG. 19, the support groove 720 may rotatably support a part of the shaft protrusion 311 of the guide assembly 300.

In the vehicle air vent 1 according to the present embodiment, the links 320 and 330 may be disposed outside the duct housing 100 and may rotate the guide case 310. Accordingly, the need for many components for setting a wind direction to be disposed in the duct housing 100 may be reduced. Accordingly, a time required for manufacturing the vehicle air vent 1 can be reduced, and manufacturing costs can be reduced.

In addition, since the vehicle air vent 1 according to the present embodiment does not have a complex inner structure when compared to a conventional air vent, a time required for replacing and repairing components constituting the vehicle air vent 1 may be reduced.

Hereinafter, a process, in which air supplied from the air conditioner (not shown) through the vehicle air vent 1 is supplied to the lower side of the passenger room, will be described.

FIG. 20A is a cross-sectional view illustrating an interior of the vehicle air vent according to the embodiment of the present disclosure, and FIG. 20B is a view illustrating an aspect in which the knob, the first wing assembly, and the guide assembly are rotated according to the embodiment of the present disclosure.

Referring to FIGS. 20A and 20B, the vehicle air vent 1 may supply air to the lower side of the passenger room through movement of the knob 500.

As illustrated in FIG. 20A, in a default state in which the components of the vehicle air vent 1 do not move upward or downward, a state in which the knob 500 and the first wing assembly 200 do not rotate about the second coupling protrusion 215 is maintained. Accordingly, the guide case 310, the first link 320, and the second link 330 similarly maintain a state in which the guide case 310, the first link 320, and the second link 330 do not rotate according to movement of the knob 500.

As illustrated in FIGS. 10 and 20B, when the knob body 510 is moved downward by manipulation of a user, the first wing assembly 200 is rotated about the second coupling protrusion 215 by the knob pin 520 coupled to the knob body 510. More specifically, since the knob pin 520 is rotated upward about the second coupling protrusion 215, the first wing body 210, along with the knob pin 520, is rotated toward an inner upper side of the duct housing 100.

In this process, the connector 530 is moved on the rotation shaft 421 in a sliding manner in the Z direction and disposed at an upper side of the rotation shaft 421.

Accordingly, the first wing body 210, along with an upper inner surface of the duct housing 100, has an inclination angle close to the first angle θ1 of the first inclined surface 620 of the guide block 600. In addition, the first wing body 210, along with the first inclined surface 620, constitutes a guide path which guides air flowing from the inlet 100a toward the outlet 100b toward the lower side of the passenger room.

At the same time, the second link body 331 coupled to the first wing assembly 200 is rotated along with the first wing assembly 200 in conjunction with movement of the first wing assembly 200.

When the second link body 331 is rotated, the rotation protrusion 332 is moved in the guide hole 322 while moving along the second link body 331. More specifically, the rotation protrusion 332 is moved from the region A to the region B of the guide hole 322.

Accordingly, the rotation protrusion 332 reaches the region B and comes into contact with one surface of the guide hole 322 disposed in the region B. The rotation protrusion 332 coming into contact with one surface of the guide hole 322 guides the first link body 321 toward a point which is the same as that of the second link body 331. More specifically, in the first link body 321, a portion, in which the guide hole 322 is disposed, is moved to a point to which the rotation protrusion 332 is moved. Accordingly, the first link body 321 and the second link body 331 are rotated in different directions.

When the first link body 321 is rotated in the direction different from the direction of the second link body 331, the first link body 321 and the guide case 310 are rotated about the shaft protrusion 311. The guide case 310 is rotated toward the inner upper side of the duct housing 100.

When the guide case 310 is rotated, the first flange 312 comes into contact with the upper inner surface of the duct housing 100. Accordingly, the first flange 312 prevents air from leaking to the upper outside of the guide case 310.

Air passing through the inlet 100a may pass through the guide case 310, flow toward the inner upper side of the duct housing 100, pass through the guide path constituted by the first wing body 210 and the first inclined surface 620, and be discharged toward the lower side of the passenger room.

In FIG. 20B of the embodiment, it is illustrated that air is supplied toward the lower side of the passenger room through the vehicle air vent 1, but the present disclosure is not limited thereto. For example, when the knob 500 is rotated upward, air may be discharged toward the upper side of the passenger room.

According to the embodiment of the present disclosure, a vertical wind direction is determined by a link disposed outside a duct housing. Accordingly, the number of components for guiding a wind direction is reduced in the duct housing, and thus manufacturing costs can be reduced.

In addition, according to the embodiment of the present disclosure, since the number of the components for adjusting the wind direction is reduced, when the components of an air vent are damaged, a time required for disassembling and replacing the components can be reduced when compared to a conventional air vent.

While the present disclosure has been described above with reference to the exemplary embodiments, it may be understood by those skilled in the art that various modifications and changes of the present disclosure may be made within a range without departing from the spirit and scope of the present disclosure defined by the appended claims. In addition, it should be interpreted that differences related to modifications and changes fall within the scope of the present disclosure defined by the appended claims.

What is claimed is:

1. A vehicle air vent comprising:
    a duct housing;
    a first wing assembly disposed at a side of an outlet of the duct housing;
    a second wing assembly disposed in the duct housing;
    a knob coupled to the first wing assembly; and
    a guide assembly coupled to the first wing assembly and rotatable in conjunction with movement of the knob, wherein:
    the knob includes a knob pin movably disposed in the first wing assembly,
    the guide assembly includes:
    a guide case which is disposed in the duct housing and configured to guide a flow of air;
    a first link coupled to an end portion of the guide case and disposed outside the duct housing; and
    a second link which connects the first link to the first wing assembly,
    the second link is rotatable according to the first wing assembly rotating along with the knob,
    the duct housing includes a stopper having a pair of protrusions each of which is obliquely disposed on an outer surface of the duct housing and comes into contact with the first link, and
    the first link is rotatable between the pair of protrusions and a rotation of the guide case stops when the first link comes into contact with one of the pair of protrusions.

2. The vehicle air vent of claim 1, wherein a rotation direction of the first link and a rotation direction of the second link are opposite to each other.

3. The vehicle air vent of claim 1, wherein the first wing assembly includes:
    a first wing body in which a first through hole is formed; and
    a second wing body which is coupled to the first wing body and in which a second through hole communicating with the first through hole is formed.

4. The vehicle air vent of claim 3, wherein a width of the first through hole and a width of the second through hole are greater than a width of the knob pin.

5. The vehicle air vent of claim 3, wherein the knob further includes:
    a knob body which supports the knob pin, is coupled to the second wing body, and is disposed outside the duct housing; and
    a connector which is coupled to each of the knob pin and the second wing assembly and is movable in conjunction with a movement of the knob pin.

6. The vehicle air vent of claim 5, wherein the knob pin includes a slide groove concavely formed in the knob pin to be movable in the first through hole in a sliding manner.

7. The vehicle air vent of claim 6, wherein the first wing body includes a slide protrusion which is coupled to the slide groove and supports the knob pin to be movable in a sliding manner.

8. The vehicle air vent of claim 1, further comprising a guide block disposed at a side of the outlet of the duct housing,
    wherein the guide block includes:
    a first inclined surface disposed to be inclined upward from the knob toward the duct housing; and
    a second inclined surface disposed to be inclined downward from the knob toward the duct housing.

9. The vehicle air vent of claim 1, further comprising a support housing which is disposed at a side of an inlet of the duct housing and supports the guide case.

10. The vehicle air vent of claim 9, wherein the guide case includes a flange protruding from each of two end portions of the guide case toward an inner surface of the duct housing.

11. The vehicle air vent of claim 10, wherein, when the guide case rotates in conjunction with a rotation of the knob, the flange comes into contact with the inner surface of the duct housing.

* * * * *